United States Patent
Yang et al.

(10) Patent No.: US 9,351,271 B2
(45) Date of Patent: May 24, 2016

(54) DEVICE POSITIONING METHOD, APPARATUS AND ELECTRONIC DEVICE BASED ON DEVICE COOPERATIVITY SYSTEM

(71) Applicants: Beijing Lenovo Software Ltd., Beijing (CN); Lenovo (Beijing) Co., Ltd., Beijing (CN)

(72) Inventors: Jie Yang, Beijing (CN); Qiang Zhang, Beijing (CN); Rongyao Fu, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 116 days.

(21) Appl. No.: 14/229,925

(22) Filed: Mar. 30, 2014

(65) Prior Publication Data

US 2015/0080033 A1 Mar. 19, 2015

(30) Foreign Application Priority Data

Sep. 17, 2013 (CN) .......................... 2013 1 0425269

(51) Int. Cl.
 *H04W 64/00* (2009.01)
 *G06F 3/0354* (2013.01)
 *G06F 3/033* (2013.01)
(52) U.S. Cl.
 CPC ............. *H04W 64/00* (2013.01); *G06F 3/0354* (2013.01); *G06F 3/033* (2013.01)

(58) Field of Classification Search
 None
 See application file for complete search history.

(56) References Cited

U.S. PATENT DOCUMENTS

| 7,463,270 | B2 | 12/2008 | Vale et al. | |
| 7,533,059 | B2 | 5/2009 | Gattis et al. | |
| 7,978,185 | B2 | 7/2011 | Wilson et al. | |
| 2013/0076894 | A1* | 3/2013 | Osman | H04W 4/02 348/135 |
| 2014/0380187 | A1* | 12/2014 | Gardenfors | G06F 3/017 715/748 |
| 2015/0169085 | A1* | 6/2015 | Ida | G06F 3/0317 345/156 |

* cited by examiner

*Primary Examiner* — Seokyun Moon
(74) *Attorney, Agent, or Firm* — Harness, Dickey & Pierce, P.L.C.

(57) ABSTRACT

A method, apparatus and electronic device for positioning a device based on a device cooperative system are disclosed. A display screen of a first electronic device is divided into M regions on which N kinds of patterns are displayed; a first cooperative device acquires a pattern of a region where the first cooperative device locates and transmits pattern information to the first electronic device; after receiving the pattern information, the first electronic device judges whether a preset positioning condition is met, and if it is not, adjusts the regions in the display screen to make the first cooperative device continue to acquire the pattern of the region where the first cooperative device locates until the preset positioning condition is met; after the preset positioning condition is met, the first electronic device determines the position where the first cooperative device locates based on the pattern information.

4 Claims, 5 Drawing Sheets

DEVICE POSITIONING METHOD, APPARATUS AND ELECTRONIC DEVICE BASED ON DEVICE COOPERATIVITY SYSTEM

The present application claims the priority to Chinese Patent Application No. 201310425269.X, entitled as "DEVICE POSITIONING METHOD, APPARATUS AND ELECTRONIC DEVICE BASED ON DEVICE COOPERATIVITY SYSTEM", filed on Sep. 17, 2013 with State Intellectual Property Office of People's Republic of China, which is incorporated herein by reference in its entirety.

FIELD

The present disclosure relates to the field of electronic device, and in particular to a method, apparatus and electronic device for positioning a device based on a device cooperative system.

BACKGROUND

With the development of science and technology, there are multiple electronic devices which facilitate people's daily life and work. The multiple electronic devices need to exchange information with each other in some cases, and thus a device cooperative system is formed. In addition, in some device cooperative systems, it is necessary to position the device. For example, a device cooperative system may be constructed by an all-in-one device and a mobile phone conventionally. The all-in-one device may be placed on a desk and the mobile phone is placed on the screen of the all-in-one device, so as to realize device coordination between the all-in-one device and the mobile phone. In this case, the all-in-one device needs to know the position of the mobile phone on the screen. That is, it is necessary to position the mobile phone.

Conventionally, there are two methods for positioning a device in a device cooperative system. The first method is to perform a touch operation on a first device in the device cooperative system. For example, a user touches the all-in-one device to indicate the position of the mobile phone. The second method is to mount a vibration apparatus on a second device of the device cooperative system. For example, a vibration apparatus is mounted on the backside of the mobile phone, and the all-in-one device can sense the position of the mobile phone by vibrating of the mobile phone.

However, a user operation is required in the first method for positioning the device, which complicates processes; and a vibration apparatus is required to be mounted on the mobile phone in the second method for positioning the device, which complicates processes and leads to a high cost.

SUMMARY

In view of the above, it is provided a method, apparatus and electronic device for positioning a device based on a device cooperative system, to solve the problem in the first method that a user operation is required which complicates processes and the problem in the second method that a vibration apparatus is required to be mounted on the mobile phone which complicates processes and leads to a high cost. The specific implementation schemes are as follows.

It is provided a method for positioning a device based on a device cooperative system which is applied to a first electronic device. The first electronic device and a first cooperative device form the device cooperative system and the first electronic device has a display screen. The method for positioning the device based on the device cooperative system includes:

dividing the display screen of the first electronic device into M regions and displaying N kinds of patterns in the M regions to enable the first cooperative device to acquire the pattern in the region where the first cooperative device locates;

receiving pattern information transmitted from the first cooperative device and judging whether a preset positioning condition is met based on the pattern information; in a case where the preset positioning condition is not met, adjusting the regions in the display screen to make the first cooperative device continue to acquire the pattern in the region where the first cooperative device locates and transmitting the corresponding pattern information to the first electronic device to judge whether the preset positioning condition is met; and in a case where the preset positioning condition is met, determining the position where the first cooperative device locates based on the pattern information transmitted from the first cooperative device to position the first cooperative device.

Preferably, the adjusting the regions in the display screen in a case where the preset positioning condition is not met includes:

determining that the position of the first cooperative device is in P suspect regions of the M regions on the display screen, based on the pattern information transmitted from the first cooperative device; and further dividing each of the suspect regions into at least two regions and making the further divided regions continue to display patterns, where the patterns displayed in the adjacent regions are different from each other, to enable the first cooperative device to continue to acquire the pattern in the further divided region where the first cooperative device locates.

Preferably, the adjusting the regions in the display screen in a case where the preset positioning condition is not met includes:

determining that the position of the first cooperative device is in P suspect regions of the M regions on the display screen, based on the pattern information transmitted from the first cooperative device; and making the suspect regions continue to display different patterns, to enable the first cooperative device to continue to acquire the pattern in the region where the first cooperative device locates.

Correspondingly, the present disclosure further discloses a method for positioning a device based on a device cooperative system which is applied to a second electronic device. The second electronic device and a second cooperative device form the device cooperative system and the second electronic device has a camera. The method for positioning the device based on the device cooperative system includes:

acquiring, by the camera, a pattern in a display region of the second cooperative device where the second electronic device locates; and transmitting pattern information corresponding to the pattern to the second cooperative device to enable the second cooperative device to determine the position of the second electronic device on the display screen based on the pattern information.

Correspondingly, the present disclosure further discloses an apparatus for positioning a device based on a device cooperative system which is applied to a first electronic device. The first electronic device and a first cooperative device form the device cooperative system and the first electronic device has a display screen. The apparatus for positioning the device based on the device cooperative system includes:

a region dividing module which is adapted to divide the display screen of the first electronic device into M regions and display N kinds of patterns in the M regions to enable the first cooperative device to acquire the pattern in the region where the first cooperative device locates;

a judging and adjusting module which is adapted to receive pattern information transmitted from the first cooperative device and judge whether a preset positioning condition is met based on the pattern information; in a case where the preset positioning condition is not met, adjust the regions in the display screen to make the first cooperative device continue to acquire the pattern in the region where the first cooperative device locates and transmit the corresponding pattern information to the first electronic device to judge whether the preset positioning condition is met; and a positioning module which is adapted to, in the case where the preset positioning condition is met, determine the position where the first cooperative device locates based on the pattern information transmitted from the first cooperative device to position the first cooperative device.

Preferably, the judging and adjusting module includes a first adjusting unit which is adapted to adjust the regions in the display screen in a case where the preset positioning condition is not met, and the first adjusting unit includes:

a first suspect region acquiring sub-unit which is adapted to determine that the position of the first cooperative device is in P suspect regions of the M regions on the display screen, based on the pattern information transmitted from the first cooperative device; and a first redividing sub-unit which is adapted to further divide each of the suspect regions into at least two regions and make the further divided regions continue to display patterns, where the patterns displayed in the adjacent regions are different from each other, to enable the first cooperative device to continue to acquire the pattern in the further divided region where the first cooperative device locates.

Preferably, the judging and adjusting unit includes a second adjusting unit, adapted to adjust the regions in the display screen in a case where the preset positioning condition is not met, and the second adjusting unit includes:

a second suspect region acquiring sub-unit which is adapted to determine that the position of the first cooperative device is in P suspect regions of the M regions on the display screen, based on the pattern information transmitted from the first cooperative device; and a second redividing sub-unit which is adapted to make the suspect regions continue to display different patterns, to enable the first cooperative device to continue to acquire the pattern in the region where the first cooperative device locates.

Correspondingly, the present disclosure further discloses an electronic device including a processor in which the apparatus for positioning the device based on the device cooperative system as described above is integrated.

Correspondingly, the present disclosure further discloses an apparatus for positioning a device based on a device cooperative system which is applied to a second electronic device. The second electronic device and a second cooperative device form the device cooperative system and the second electronic device has a camera, and the apparatus for positioning the device based on the device cooperative system includes:

a pattern acquiring module which is adapted to acquire, by the camera, a pattern in a display region of the second cooperative device where the second electronic device locates; and a transmission module which is adapted to transmit pattern information corresponding to the pattern to the second cooperative device to enable the second cooperative device to determine the position of the second electronic device on the display screen based on the pattern information.

Correspondingly, the present disclosure further discloses an electronic device including a processor in which the apparatus for positioning a device based on a device cooperative system as described above is integrated. An electronic device which with.

The present disclosure discloses a method for positioning a device based on a device cooperative system which is applied to a first electronic device. The first electronic device and a first cooperative device form the device cooperative system and the first electronic device has a display screen. In the method, the display screen of the first electronic device is firstly divided into M regions and N kinds of patterns are displayed in the M regions. The first cooperative device acquires the pattern in the region where the first cooperative device locates and transmits corresponding pattern information to the first electronic device. After receiving the pattern information transmitted from the first cooperative device, the first electronic device judges whether a preset positioning condition is met based on the pattern information, and adjusts the regions in the display screen in a case where the preset positioning condition is not met, to enable the first cooperative device to continue to acquire the pattern in the region where the first cooperative device locates, until the preset positioning condition is met. After the preset positioning condition is met, the first electronic device determines the position where the first cooperative device locates based on the pattern information transmitted from the first cooperative device.

By the above method for positioning the device based on the device cooperative system, the device may be positioned only by exchanging information between the first electronic device and the first cooperative device. Therefore, no additional user operation is needed. In addition, only the display screen of the first electronic device and the camera of the first cooperative device are used, and no additional apparatus needs to be mounted on the first electronic device and the first cooperative device. Therefore, processes are simplified and cost is saved.

BRIEF DESCRIPTION OF THE DRAWINGS

The accompany drawings needed to be used in the description of the embodiments or the prior art will be described briefly below to make the technical solutions according to the embodiments of the present disclosure or according to the prior art become clearer. It is obvious that the accompany drawings in the following description are only some embodiments of the present disclosure. For those skilled in the art, other accompany drawings may be obtained based on these accompany drawings without any creative work.

DETAILED DESCRIPTION

The technical solution according to the embodiments of the present disclosure will be described clearly and completely as follows in conjunction with the accompany drawings in the embodiments of the present disclosure. It is obvious that the described embodiments are only part of embodiments of the disclosure. All the other embodiments obtained by those skilled in the art based on the embodiments in the present disclosure without any creative work belong to the scope of the present disclosure.

In order to solve the problem in the first method that a user operation is required which complicates processes and the problem in the second method that a vibration apparatus is required to be mounted on the mobile phone which complicates processes and leads to a high cost, it is provided a method, apparatus and electronic device for positioning a device based on a device cooperative system, and the specific implementations are as follows.

First Embodiment

The first embodiment of the present disclosure discloses a method for positioning a device based on a device cooperative system which is applied to a first electronic device. The first electronic device and a first cooperative device form the device cooperative system, and the first electronic device has a display screen on which the first cooperative device is placed. The scheme disclosed by the first embodiment of the present disclosure is to position the first cooperative device on the display screen.

Figure 1:
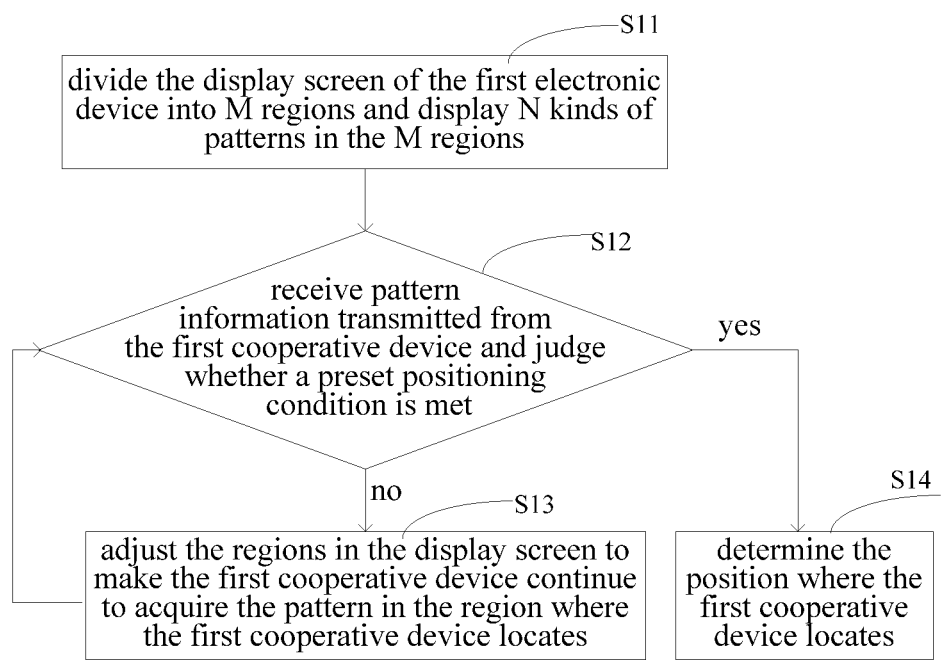
FIG. 1 is a flowchart of a method for positioning a device based on a device cooperative system according to an embodiment of the present disclosure.

Referring to the flowchart shown in FIG. 1, the method for positioning the device based on the device cooperative system disclosed by the first embodiment of the present disclosure includes Steps S11 to S14.

Step S11 is to divide the display screen of the first electronic device into M regions and displaying N kinds of patterns in the M regions to enable the first cooperative device to acquire the pattern in the region where the first cooperative device locates. The patterns displayed in the adjacent regions are different from each other.

In the present disclosure, the first electronic device has a display screen, and the first cooperative device which forms the device cooperative system together with the first electronic device is placed on the display screen. The display screen is divided into different regions and displays patterns. In this case, the position of the first cooperative device on the display screen may be approximately determined based on the pattern acquired by the first cooperative device.

In this step, the display screen is required to be divided into M regions on which N kinds of patterns are displayed in the M regions, where the value of N is less than or equal to the value of M.

The first cooperative device has a camera which acquires a pattern of the region in the display screen where the first cooperative device locates and transmit the corresponding pattern information to the first electronic device. The pattern information may be codes representing different patterns, such as "0001" and "0002". Alternatively, the pattern information may be information indicating the current pattern, such as "red".

Step S12 is to receive pattern information transmitted from the first cooperative device and judge whether a preset positioning condition is met based on the pattern information; in a case where the preset positioning condition is not met, perform Step S13; and in a case where the preset positioning condition is met, perform Step S14.

If the pattern information transmitted from the first cooperative device is received and the position of the first cooperative device on the display screen can be determined based on the pattern information, it is considered that the preset positioning condition is met.

For example, in a case where the first cooperative device occupies an area being 1/64 of the area of the display screen, M=64 and N=64 in Step S11. That is, the display screen is divided into 64 regions and one color is displayed in one divided region. In this case, the first cooperative device acquires the pattern of the region where the first cooperative device locates by the camera, and transmits the corresponding pattern information to the first electronic device. Then the first electronic device may position the first cooperative device based on the pattern information.

Step S13 is to, in a case where it is determined that the preset positioning condition is not met based on the pattern information, adjust the regions in the display screen to causes the first cooperative device to continue to acquire the pattern in the region where the first cooperative device locates and transmit the corresponding pattern information to the first electronic device and return to Step S12 to continue to judge whether the preset positioning condition is met based on the received pattern information.

In dividing the display screen and displaying the pattern, the first cooperative device may be unable to distinguish similar patterns if there are multiple patterns displayed due to a limitation of a photosensitive element of the camera in the first cooperative device; or the display screen of the first electronic device cannot display multiple patterns due to a limitation of pixels supported by the display screen of the first electronic device. For the above two cases, in Step S12, the position of the first cooperative device may be unable to be determined based on the received pattern information transmitted from the first cooperative device, that is, the preset positioning condition is not met.

In a case where the preset positioning condition is not met, the regions in the display screen may be adjusted continuously to causes the first cooperative device to continue to acquire the pattern of the region where the first cooperative device locates, according to the scheme provided in Step S13.

Step S14 is to, after it is determined that the preset positioning condition is met based on the received pattern information transmitted from the first cooperative device, determine the position where the first cooperative device locates based on the pattern information transmitted from the first cooperative device to position the first cooperative device.

Since the pattern displayed in the first electronic device corresponds to the region where the pattern is displayed, the region in the display screen of the first electronic device captured by the first cooperative device, that is, the position of the first cooperative device on the display screen, may be determined based on the pattern information transmitted from the first cooperative device.

The first embodiment of the present disclosure discloses the method for positioning the device based on the device cooperative system which is applied to the first electronic device. The first electronic device and the first cooperative device constitute the device cooperative system and the first electronic device has a display screen. In the method, the display screen of the first electronic device is divided into M regions and N kinds of patterns are displayed in the M regions. The first cooperative device acquires the pattern in the region where the first cooperative device locates and then transmits corresponding pattern information to the first electronic device. After receiving the pattern information transmitted from the first cooperative device, the first electronic device judges whether a preset positioning condition is met based on the pattern information, and in a case where the preset positioning condition is not met, adjusts the regions in the display screen to enable the first cooperative device to continue to acquire the pattern in the region where the first cooperative device locates, until the preset positioning condition is met. After the preset positioning condition is met, the first electronic device determines the position where the first cooperative device locates based on the pattern information transmitted from the first cooperative device.

With the above method for positioning the device based on the device cooperative system, the device may be positioned only by changing information between the first electronic device and the first cooperative device. Therefore, no additional user operation is needed. In addition, only the display screen of the first electronic device and the camera of the first cooperative device are used, and no additional apparatus needs to be mounted on the first electronic device and the first cooperative device. Therefore, processes are simplified and cost is saved.

Second Embodiment

The second embodiment of the present disclosure discloses a method for positioning a device based on a device cooperative system which is applied to a first electronic device. The first electronic device and a first cooperative device form a device cooperative system, and the first electronic device has a display screen on which the first cooperative device is placed. The scheme disclosed by the second embodiment of the present disclosure is used to position the first cooperative device on the display screen.

Figure 2:
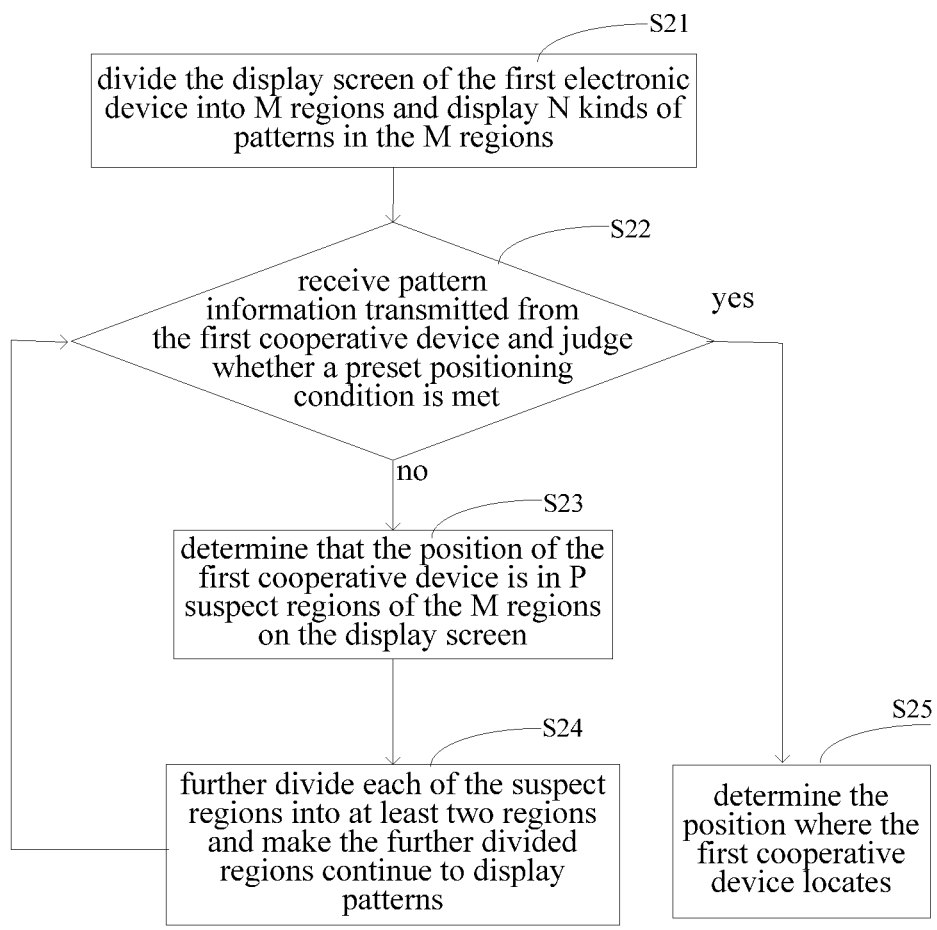
FIG. 2 is a flowchart of another method for positioning a device based on a device cooperative system according to an embodiment of the present disclosure.

Referring to a flowchart shown in FIG. 2, the method for positioning the device based on the device cooperative system disclosed by the second embodiment of the present disclosure includes Steps S21 to S25.

Step S21 is to divide the display screen of the first electronic device into M regions and displaying N kinds of patterns in the M regions to enable the first cooperative device to acquire the pattern in the region where the first cooperative device locates. The patterns displayed in the adjacent regions are different from each other.

Step S22 is to receive pattern information transmitted from the first cooperative device and judge whether a preset positioning condition is met based on the pattern information; in a case where the preset positioning condition is not met, perform Step S23; and in a case where the preset positioning condition is met, perform Step S25.

Processes from Steps S21 to S22 are the same as the processes from Steps S11 to S12 in the first embodiment, hence reference may be made to each other, and the detailed description thereof is omitted herein.

Step S23 is to determine that the position of the first cooperative device is in P suspect regions of the M regions on the display screen, based on the pattern information transmitted from the first cooperative device.

For example, in a case where the first electronic device is divided into 4 regions in Step S21 and there are 4 different patterns of red, yellow, blue and green displayed in the 4 regions respectively, and if it is determined that the first cooperative device locates in the red region based on the pattern information transmitted from the first cooperative device, M=4 and P=1, and the red region is determined as the suspect region.

In a case that the divided regions are more than 4 in Step S21 and the patterns displayed in nonadjacent regions are the same, the number of the suspect regions may be more than 1.

Step S24 is to further divide each of the suspect regions into at least two regions and making the further divided regions continue to display patterns, where the patterns displayed in the adjacent regions are different from each other, to enable the first cooperative device to continue to acquire the pattern in the further divided region where the first cooperative device locates; then return to perform Step S22.

For example, if it is determined that the suspect region is a region corresponding to the red pattern in Step S23, the suspect region is further divided and the further divided regions continue to display patterns. The first cooperative device may continue to acquire the pattern where the further divided region locates.

After the suspect region is divided, the first cooperative device may continue to acquire the pattern of the further divided region where the first cooperative device locates and transmit the pattern information to the first electronic device. The first electronic device returns to Step S22 after receiving the pattern information to judge whether the preset positioning condition is met.

Step S25 is to determine the position where the first cooperative device locates based on the pattern information transmitted from the first cooperative device, after determining that the preset positioning condition is met.

The process of Step S25 is the same as the process of Step S14 in the first embodiment, reference may be made to each other, and the detailed description thereof is omitted herein.

A method for adjusting the region in the display screen of the first electronic device in a case where the preset positioning condition is not met is provided in Step S23 and Step S24 of the present disclosure. In the method, if the first cooperative device can not be positioned based on the pattern information transmitted from the first cooperative device, a suspect region is determined and further divided to display different patterns, so that the first cooperative device may be positioned precisely.

Figure 3A:
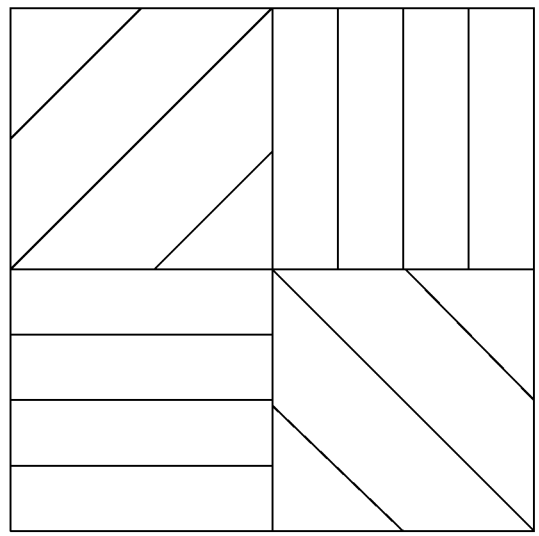
FIGS. 3a and 3b are schematic diagrams of a display screen in a method for positioning a device based on a device cooperative system according to an embodiment of the present disclosure.
Figure 3B:
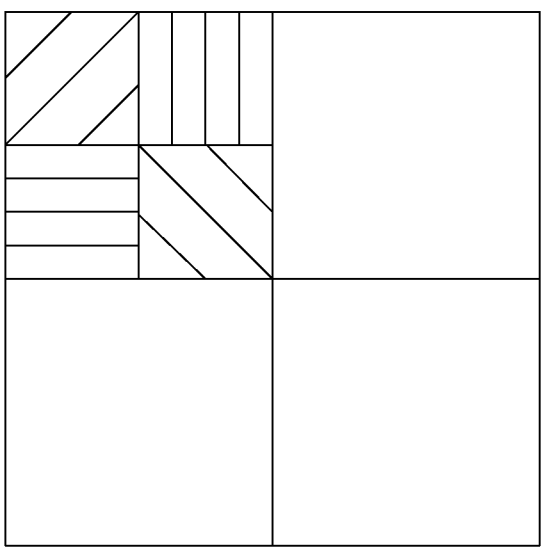

Reference is made to a schematic diagram of a display screen shown in FIG. 3. FIG. 3a is a schematic diagram of a display screen which is divided into regions in Step S21. In a case where the first cooperative device is determined to locate in an upper-left region based on the pattern information transmitted from the first cooperative device and the positioning still can not satisfy a positioning demand, the region is determined to be a suspect region which is further divided. FIG. 3b is a schematic diagram of a further divided suspect region. In the schematic diagram, the suspect region is further divided and a pattern is displayed in each of the further divided regions. The first cooperative device acquires the pattern of the further divided region where the first cooperative device locates and transmits information of the acquired pattern to the first electronic device to enable the first electronic device to determine the position of the first cooperative device based on the acquired pattern information. Further, if the division still can not position the first cooperative device, a suspect region is further acquired and further divided until the first cooperative device is positioned precisely.

Third Embodiment

The third embodiment of the present disclosure discloses a method for positioning a device based on a device cooperative system which is applied to a first electronic device. The first electronic device and a first cooperative device form the device cooperative system, and the first electronic device has a display screen on which the first cooperative device is placed. The scheme disclosed by the third embodiment of the present disclosure is used to position the first cooperative device on the display screen.

Figure 4:
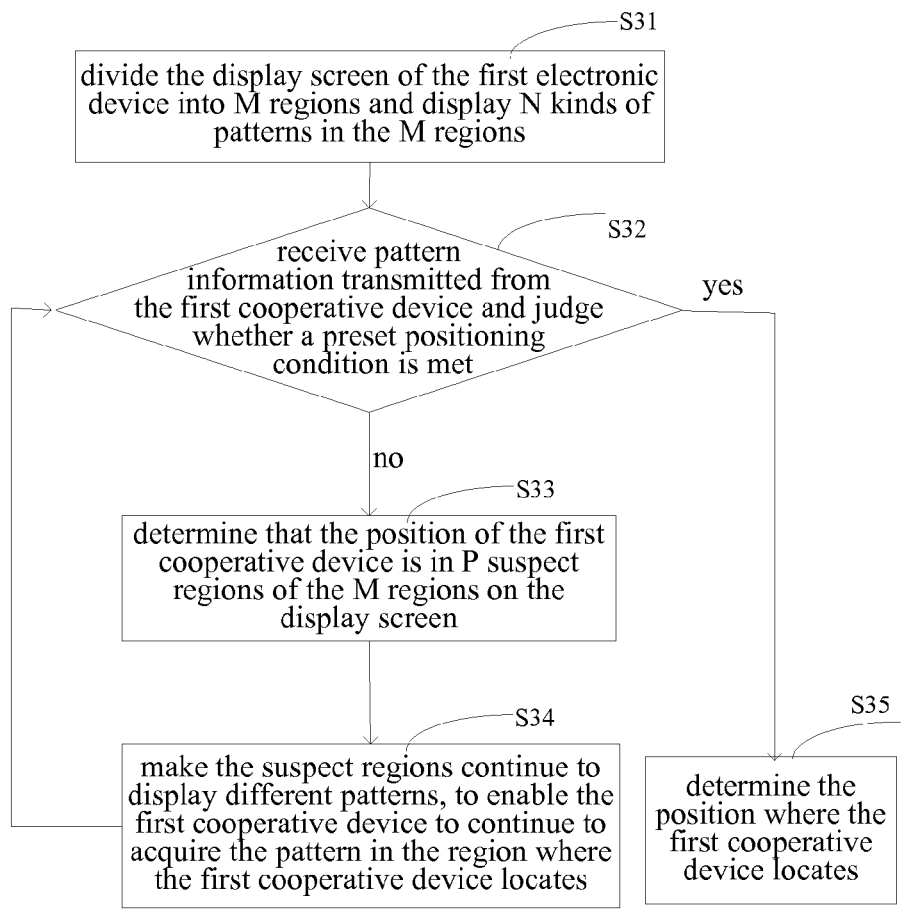
FIG. 4 is a flowchart of another method for positioning a device based on a device cooperative system according to an embodiment of the present disclosure.

Referring to a flowchart shown in FIG. 4, the method for positioning the device based on the device cooperative system includes Steps S31 to S35.

Step S31 is to divide the display screen of the first electronic device into M regions and displaying N kinds of patterns in the M regions to enable the first cooperative device to acquire the pattern in the region where the first cooperative device locates. The patterns displayed in adjacent regions are different from each other.

Step S32 is to receive pattern information transmitted from the first cooperative device and judge whether a preset positioning condition is met based on the pattern information; in a case where the preset positioning condition is not met, perform Step S33; and in a case where the preset positioning condition is met, perform Step S35.

The processes from Steps S31 to S32 are the same as the processes from Steps S11 to S12 in the first embodiment, hence reference may be made to each other, and the detailed description thereof is omitted herein.

Step S33 is to determine that the position of the first cooperative device is in P suspect regions of the M regions on the display screen, based on the pattern information transmitted from the first cooperative device.

For example, in a case where the first cooperative device occupies an area being ⅟₆₄ of the area of the display screen of the first electronic device, the display screen is divided into 64 regions. Considering the limitation of a photosensitive element of the camera in the first cooperative device or the limitation of pixels supported by the display screen of the first electronic device, each eight regions in the display screen of the first cooperative device is a group to display eight patterns in the display screen, such as red, orange, yellow, green, cyan, blue, purple and black. If the pattern information transmitted from the first cooperative device indicates that the first cooperative device locates in the yellow region, eight regions displaying the yellow pattern are determined as suspect regions based on the pattern transmitted from the first cooperative device, where M=64 and P=8.

Step S34 is to make the suspect regions continue to display different patterns, to enable the first cooperative device to continue to acquire the pattern in the region where the first cooperative device locates, and then return to perform Step S32.

For example, in Step S33, the eight suspect regions continue to display different patterns after the eight suspect regions are determined. If there are still eight patterns displayed and the pattern information transmitted from the first cooperative device indicates that the first cooperative device locates in a blue region, the position where the first cooperative device locates may be determined based on the pattern information transmitted from the first cooperative device, to achieve the position of the first cooperative device.

In Step S33 and Step S34 of the present disclosure, a method for adjusting regions in the display screen of the first electronic device in a case where the preset positioning condition is not met is disclosed. In this method, the value of M is large enough. If the first cooperative device can not be positioned based on the pattern information transmitted from the first cooperative device, suspect regions are determined based on the pattern information and the suspect regions continue to display different patterns, to position the first cooperative device precisely.

Fourth Embodiment

Figure 5:
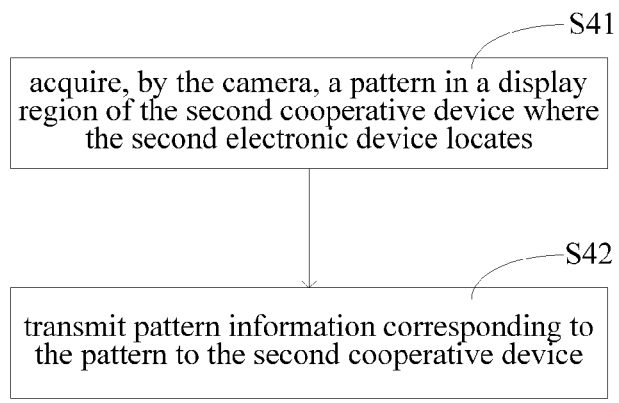
FIG. 5 is a flowchart of another method for positioning a device based on a device cooperative system according to an embodiment of the present disclosure.

The fourth embodiment of the present disclosure discloses a method for positioning a device based on a device cooperative system which is applied to a second electronic device. The second electronic device and a second cooperative device form the device cooperative system and the second electronic device has a camera. Referring to a flowchart shown in FIG. 5, the method for positioning the device based on the device cooperative system includes Steps S41 to S42.

Step S41 is to acquire, by the camera, a pattern in a region of a display screen of the second cooperative device where the second electronic device locates.

Step S42 is to transmit pattern information corresponding to the pattern to the second cooperative device to enable the second cooperative device to determine the position of the second electronic device in the display screen based on the pattern information.

The pattern information may be codes indicating different patterns, such as "0001" and "0002". Alternatively, the pattern information may be information indicating the current pattern, such as "red", which is not limited in the present disclosure.

In the embodiment, the second cooperative device is the first electronic device described in the first to third embodiments, and the second electronic device is the first cooperative device described in the first to third embodiments.

In the scheme disclosed by Step S41 and Step S42, the second electronic device acquires the pattern in the region of the display region of the display screen where the second electronic device locates by the camera mounted in itself and transmit the corresponding pattern information to the second cooperative device, hence the second cooperative device may position the second electronic device based on the pattern information. In the scheme, the second electronic device may be positioned only by changing information between the second electronic device and the second cooperative device. Therefore, no additional user operation is needed. In addition, only the display screen of the second cooperative device and the camera of the second electronic device are used, and no additional apparatus needs to be mounted on the second electronic device and the second cooperative device. Therefore, processes are simplified and cost is saved.

Fifth Embodiment

Figure 6:
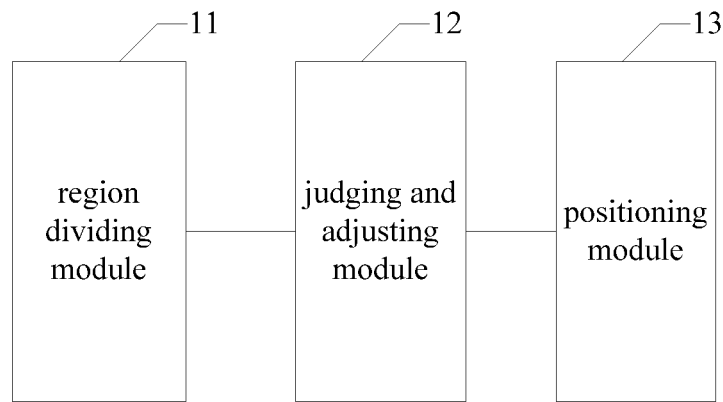
FIG. 6 is a schematic structural diagram of an apparatus for positioning a device based on a device cooperative system according to an embodiment of the present disclosure.

The fifth embodiment of the present disclosure discloses an apparatus for positioning a device based on a device cooperative system which is applied to a first electronic device. The first electronic device and a first cooperative device form the device cooperative system and the first electronic device has a display screen. Referring to a schematic structural diagram shown in FIG. 6, the apparatus for positioning the device based on the device cooperative system includes a region dividing module 11, a judging and adjusting module 12 and a positioning module 13.

The region dividing module 11 is adapted to divide the display screen of the first electronic device into M regions and display N kinds of patterns in the M regions to enable the first cooperative device to acquire the pattern in the region where the first cooperative device locates.

The judging and adjusting module 12 is adapted to receive pattern information transmitted from the first cooperative device and judge whether a preset positioning condition is met based on the pattern information; in a case where the preset positioning condition is not met, adjust the regions in the display screen to cause the first cooperative device to continue to acquire the pattern in the region where the first cooperative device locates and transmit the corresponding pattern information to the first electronic device to judge whether the preset positioning condition is met.

The positioning module 13 is adapted to, in a case where the preset positioning condition is met, determine the position where the first cooperative device locates based on the pattern information transmitted from the first cooperative device to position the first cooperative device.

The fifth embodiment of the present disclosure discloses the apparatus for positioning the device based on the device cooperative system which is applied to the first electronic device. The first electronic device and the first cooperative device form the device cooperative system and the first electronic device has the display screen. In the apparatus, the display screen of the first electronic device is divided into M regions in which N kinds of patterns are displayed by the region dividing module. The first cooperative device acquires the pattern of the region where the first cooperative device locates and then transmits the corresponding pattern information to the first electronic device. After the first electronic device receives the pattern information transmitted from the first cooperative device, the first electronic device, the judging and adjusting module judges whether the preset positioning condition is met based on the pattern information, and adjusts the regions in the display screen in a case where the preset positioning condition is not met, to enable the first cooperative device to continue to acquire the pattern of the region where the first cooperative device locates until the preset positioning condition is met. After the preset positioning condition is met, the positioning module of the first electronic device determines the position where the first cooperative device locates based on the pattern information transmitted from the first cooperative device.

With the apparatus for positioning the device based on the device cooperative system, the device may be positioned only by changing information between the first electronic device and the first cooperative device. Therefore, no additional user operation is needed. In addition, only the display screen of the first electronic device and the camera of the first cooperative device are used, and no additional apparatus needs to be mounted on the first electronic device and the first cooperative device. Therefore, processes are simplified and cost is saved.

Furthermore, the judging and adjusting module includes a first adjusting unit adapted to adjust the regions in the display screen in a case where the preset positioning condition is not met. The first adjusting unit includes:

a first suspect region acquiring sub-unit, adapted to determine that the position of the first cooperative device is in P suspect regions of the M regions on the display screen, based on the pattern information transmitted from the first cooperative device; and a first redividing sub-unit, adapted to further divide each of the suspect regions into at least two regions and make the further divided regions continue to display patterns, where the patterns displayed in the adjacent regions are different from each other, to enable the first cooperative device to continue to acquire the pattern in the further divided region where the first cooperative device locates.

In addition, the judging and adjusting module includes a second adjusting unit which is adapted to adjust the regions in the display screen in a case where the preset positioning condition is not met. The second adjusting unit includes:

a second suspect region acquiring sub-unit, adapted to determine that the position of the first cooperative device is in P suspect regions of the M regions on the display screen, based on the pattern information transmitted from the first cooperative device; and a second redividing sub-unit, adapted to make the suspect regions continue to display different patterns, to enable the first cooperative device to continue to acquire the pattern in the region where the first cooperative device locates.

Correspondingly, the present disclosure further discloses an electronic device including a processor in which the apparatus for positioning the device based on the device cooperative system as described above is integrated.

Sixth Embodiment

Figure 7:
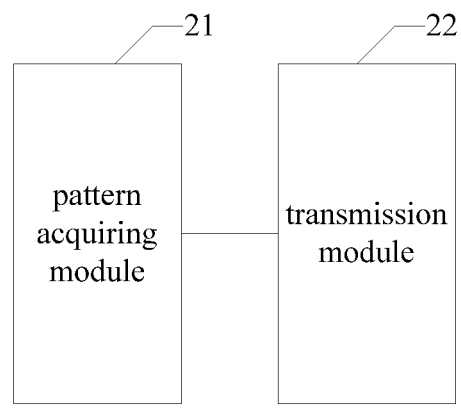
FIG. 7 is a schematic structural diagram of another apparatus for positioning a device based on a device cooperative system according to an embodiment of the present disclosure.

The sixth embodiment of the present disclosure discloses an apparatus for positioning a device based on a device cooperative system which is applied to a second electronic device. The second electronic device and a second cooperative device form the device cooperative system and the second electronic device has a camera. Referring to a schematic structural diagram shown in FIG. 7, the apparatus for positioning the device based on the device cooperative system includes a pattern acquiring module 21 and a transmission module 22.

The pattern acquiring module 21 is adapted to acquire, by the camera, a pattern in a region of a display screen of the second cooperative device where the second electronic device locates.

The transmission module 22 is adapted to transmit pattern information corresponding to the pattern to the second cooperative device to enable the second cooperative device determine the position of the second electronic device in the display screen based on the pattern information.

In the embodiment, the second cooperative device is the first electronic device in the fifth embodiment, and the second electronic device is the first cooperative device in the fifth embodiment.

In the scheme disclosed by the sixth embodiment, the second electronic device acquires the pattern of the display region where the second electronic device locates by the pattern acquiring module, and transmits the corresponding pattern information to the second cooperative device by the transmission module to enable the second cooperative device to position the second electronic device based on the pattern information. In the scheme, the second electronic device may be positioned only by changing information between the second electronic device and the second cooperative device. Therefore, no additional user operation is needed. In addition, only the display screen of the second cooperative device and the camera of the second electronic device are used, and no additional apparatus needs to be mounted on the second electronic device and the second cooperative device. Therefore, processes are simplified and cost is saved.

Correspondingly, the present disclosure further discloses an electronic device including a processor in which the apparatus for positioning the device based on the device cooperative system as described above is integrated.

It may be understood by those skilled in the art that, the units and algorithm steps of the examples described in conjunction with the embodiments disclosed herein may be realized by electronic hardware or a combination of computer software and electronic hardware. Whether the above functions are performed in a hardware or software manner depends on specific applications and design constraint condition of the technical scheme. Those skilled in the art may realize the described functions with different methods for each specific application, but the realizations should not be considered to exceed the scope of the present disclosure.

It should be understood by those skilled in the art, for a convenient and simple description, specific processes of the above systems, apparatuses and units may refer to the corresponding processes in the aforementioned method embodiments and will not be described herein.

In the embodiments provided by the present application, it should be understood that, the system, apparatus and method disclosed herein may be implemented in other manners. And the embodiments of the apparatus described above are only illustrative. For example, the division of the units is only a division on logical function, and there may be other division modes in the practical implementation. For example, multiple units or components may be integrated into another system or combined; and some features may be omitted or unperformed. In addition, the coupling, direct coupling or communication connection displayed or discussed above may be implemented through some interfaces. And the indirect coupling or communication connection between the apparatuses or units may be electrical, mechanical or other forms.

In the above, the unit which is described as a separate component may be or may be not separate in physical. The component displayed as a unit may be or may be not a physical unit. That is, the component may locate at one place or may be distributed on multiple network units. The object of the present embodiment may be achieved by selecting a part or all of the units according to the practical needs.

Furthermore, function units in the embodiments of the present disclosure may be integrated into one processing unit; each of the function units may be a single unit; or two or more function units may be integrated into one unit.

If realized in a form of software function module, and brought to market or used as a separate product, the functions may be stored in a computer readable storage medium. Based on such understanding, the essence of the technical scheme according to the embodiments of the present disclosure or the part contributing to the existing technologies may be embodied in a form of software product. The computer software product is stored in one storage medium, including several instructions which are used to make one computer device (such as a PC, a server or a network device) perform a part of or all of the steps of the method described in embodiments of the present disclosure. And the aforementioned storage medium includes various mediums which may store a program code, such as a U disk, a mobile hard drive, a Read-Only Memory (ROM), a Random Access Memory (RAM), a magnetic disk or an optical disk.

The description of the embodiments herein enables those skilled in the art to implement or use the present invention. Numerous modifications to the embodiments will be apparent to those skilled in the art, and the general principle herein can be implemented in other embodiments without deviation from the spirit or scope of the present invention. Therefore, the present invention will not be limited to the embodiments described herein, but in accordance with the widest scope consistent with the principle and novel features disclosed herein.

The invention claimed is:

1. A method for positioning a device based on a device cooperative system, which is applied to a first electronic device, the device cooperative system comprising the first electronic device and a first cooperative device, and the first electronic device comprising a display screen, wherein the method for positioning the device based on the device cooperative system comprises:
   dividing a display screen of the first electronic device into M regions and displaying N patterns in the M regions to enable the first cooperative device to acquire a pattern of the N patterns displayed in one of the M regions located by a camera of the first cooperative device;
   receiving pattern information transmitted from the first cooperative device and judging whether a preset positioning condition is met based on the pattern information;
   in a case where the preset positioning condition is not met, adjusting the regions in the display screen to enable the first cooperative device to continue to acquire the pattern displayed in the region located by the camera of the first cooperative device and transmit the pattern information to the first electronic device to judge whether the preset positioning condition is met;
   in a case where the preset positioning condition is met, determining a position where the first cooperative device locates based on the pattern information transmitted from the first cooperative device to position the first cooperative device; and
   in a case where the preset positioning condition is not met:
      determining that the position of the first cooperative device is in a plurality of suspect regions of the M regions on the display screen based on the pattern information transmitted from the first cooperative device;
      making only the plurality of suspect regions to display different patterns; and enabling the first cooperative device to continue to acquire the pattern displayed in the region located by the camera of the first cooperative device, wherein M and N are positive integers.

2. The method according to claim 1 further comprising:
   further dividing each of the suspect regions into at least two regions and making the further divided regions continue to display patterns, to enable the first cooperative device to continue to acquire the pattern displayed in one of the further divided regions located by the camera of the first cooperative device, wherein the patterns displayed in the adjacent regions are different.

3. An apparatus for positioning a device based on a device cooperative system, which is applied to a first electronic device, the device cooperative system comprising the first electronic device and a first cooperative device, and the first electronic device comprising a display screen, wherein the apparatus for positioning the device based on the device cooperative system comprises:
   a region dividing module, adapted to divide the display screen of the first electronic device into M regions and display N patterns in the M regions to enable the first cooperative device to acquire a pattern of the N patterns displayed in one of the M regions located by a camera of the first cooperative device;

a judging and adjusting module, adapted to receive pattern information transmitted from the first cooperative device and judge whether a preset positioning condition is met based on the pattern information; and in a case where the preset positioning condition is not met, adjust the regions in the display screen to enable the first cooperative device to continue to acquire the pattern displayed in the region located by the camera of the first cooperative device and transmit pattern information to the first electronic device to judge whether the preset positioning condition is met; and a positioning module, adapted to, in a case where the preset positioning condition is met, determine a position where the first cooperative device locates based on the pattern information transmitted from the first cooperative device to position the first cooperative device, wherein, in a case where the preset positioning condition is not met, the judging and adjusting unit is further configured to:

determine that the position of the first cooperative device is in a plurality of suspect regions of the M regions on the display screen based on the pattern information transmitted from the first cooperative device;

make only the plurality of suspect regions to display different patterns; and enable the first cooperative device to continue to acquire the pattern displayed in the region located by the camera of the first cooperative device, wherein M and N are positive integers.

4. The apparatus according to claim 3, wherein in a case where the preset positioning condition is not met the judging and adjusting module is configured to:

further divide each of the suspect regions into at least two regions and make the further divided regions continue to display patterns, to enable the first cooperative device to continue to acquire the pattern displayed in one of the further divided regions located by the camera of the first cooperative device, wherein the patterns displayed in adjacent regions are different.

* * * * *